US 011589112B2

(12) United States Patent
Gupta et al.

(10) Patent No.: US 11,589,112 B2
(45) Date of Patent: Feb. 21, 2023

(54) SYSTEMS AND METHODS TO DETERMINE REDUCTION OF INTEREST IN A CONTENT SERIES

(71) Applicant: Rovi Guides, Inc., San Jose, CA (US)

(72) Inventors: Vikram Makam Gupta, Karnataka (IN); Vishwas Sharadanagar Panchaksharaiah, Tumkur District (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/729,243

(22) Filed: Apr. 26, 2022

(65) Prior Publication Data

US 2022/0256239 A1 Aug. 11, 2022

Related U.S. Application Data

(63) Continuation of application No. 16/867,338, filed on May 5, 2020, now Pat. No. 11,350,162.

(51) Int. Cl.
*H04N 21/442* (2011.01)
*H04N 21/24* (2011.01)
*H04N 21/466* (2011.01)
*H04N 21/258* (2011.01)

(52) U.S. Cl.
CPC ... *H04N 21/44204* (2013.01); *H04N 21/2407* (2013.01); *H04N 21/25891* (2013.01); *H04N 21/44222* (2013.01); *H04N 21/4667* (2013.01); *H04N 21/4668* (2013.01)

(58) Field of Classification Search
CPC ....... H04N 21/23418; H04N 21/44008; H04N 21/44204; H04N 21/25891; H04N 21/4668; H04N 21/4667; H04N 21/44222; H04N 21/2407; H04N 21/4882; H04N 21/47214; H04N 21/4532; H04N 21/8456; H04N 21/4622
USPC .......................................................... 725/14
See application file for complete search history.

(56) References Cited

U.S. PATENT DOCUMENTS

| 8,782,701 | B2 | 7/2014 | Yu et al. |
| 9,015,736 | B2 | 4/2015 | Cordray et al. |
| 9,344,749 | B2 | 5/2016 | Hoctor et al. |
| 9,883,233 | B1 | 1/2018 | Barton |
| 10,264,330 | B1 | 4/2019 | Candelore et al. |

(Continued)

OTHER PUBLICATIONS

Boone, Brian , "Actor Replacements That Totally Ruined the Show", Brian Boone, Actor Replacements That Totally Ruined the Show, Jan. 25, 2020, Looper, pp. 3 and 10, https://www.looper.com/35589/actor-replacements-ruined-show/ (Year: 2020), Jan. 25, 2020.

(Continued)

*Primary Examiner* — Cynthia M Fogg
(74) *Attorney, Agent, or Firm* — Haley Guiliano LLP

(57) ABSTRACT

Systems and methods are provided herein for determining reduction of interest in a content series and to increasing the interest upon such determination. This may be accomplished by a device monitoring consumption of a content series to determine a pattern of consumption. The device may identify a change in the pattern of consumption indicative of a reduction of interest and determine a reason for the reduction in interest. Based on the reason for the reduction of interest, the device may provide an operation, such as a spoiler, to increase interest in the content series.

18 Claims, 8 Drawing Sheets

(56) References Cited

U.S. PATENT DOCUMENTS

| | | |
|---|---|---|
| 11,153,643 B1 | 10/2021 | Gupta et al. |
| 2002/0178446 A1 | 11/2002 | Sie et al. |
| 2007/0157249 A1 | 7/2007 | Cordray et al. |
| 2009/0325706 A1* | 12/2009 | Geist, Jr. .......... H04N 21/44224 463/40 |
| 2013/0174035 A1 | 7/2013 | Grab |
| 2014/0067828 A1 | 3/2014 | Archibong et al. |
| 2014/0150007 A1 | 5/2014 | Randall et al. |
| 2015/0304711 A1 | 10/2015 | Zhang et al. |
| 2015/0312604 A1 | 10/2015 | Hoctor et al. |
| 2015/0312618 A1 | 10/2015 | McElhatten et al. |
| 2015/0365729 A1 | 12/2015 | Kaya et al. |
| 2016/0014461 A1 | 1/2016 | Leech et al. |
| 2016/0165289 A1 | 6/2016 | McClanahan et al. |
| 2017/0078758 A1 | 3/2017 | Lewis et al. |
| 2017/0127137 A1 | 5/2017 | Arunachalam |
| 2017/0318317 A1 | 11/2017 | Liang |
| 2018/0124438 A1 | 5/2018 | Barnett |
| 2018/0184170 A1 | 6/2018 | Stathacopoulos et al. |
| 2018/0220198 A1 | 8/2018 | Matthews et al. |
| 2018/0367835 A1 | 12/2018 | Hamidi-Rad et al. |
| 2019/0230387 A1 | 7/2019 | Gersten |
| 2020/0145720 A1 | 5/2020 | Krauss et al. |
| 2020/0304866 A1 | 9/2020 | Farre Guiu et al. |
| 2021/0084363 A1 | 3/2021 | Sharma |
| 2021/0160590 A1* | 5/2021 | Aher .................. H04N 21/4825 |
| 2021/0352364 A1 | 11/2021 | Gupta et al. |
| 2021/0352365 A1 | 11/2021 | Gupta et al. |

OTHER PUBLICATIONS

Bost, et al., "Remembering Winter Was Coming", Springer Science and Business Media LLC, vol. 78, pp. 35, 373-35,399 (2019)., Sep. 2019.

Fukushima, T., et al., "Audience Ratings Predication of TV Dramas Based on the Cast and Their Popularity," 2016 IEEE Second International Conference on Multimedia Big Data (BigMM), pp. 279-286, doi: 10.1109/BigMM.2016.24, 2016.

Thaipisutikul, T., et al., "Beyond the Tweets: Discovering factors that influence TV series from ubiquitous social networks," 10th International Conference on Ubi-multimedia Computing and Workshops (Ubi-Media), pp. 1-6, doi 10.1109/UMEDIA.2017.8074106, 2017.

* cited by examiner

SYSTEMS AND METHODS TO DETERMINE REDUCTION OF INTEREST IN A CONTENT SERIES

CROSS REFERENCE TO RELATED APPLICATIONS

This application is a continuation of U.S. patent application Ser. No. 16/867,338 (now allowed), filed May 5, 2020. The disclosure of which is hereby incorporated herein in its entirety.

BACKGROUND

The present disclosure is directed to computer-implemented techniques for determining reduction of interest in a content series and to increasing the interest upon such determination.

SUMMARY

Television programs typically have large viewership in the first few seasons, but as time progresses, some viewers lose interest, causing viewership to decline. If viewership of a television program declines, the television program could end up losing valuable production investments and may ultimately be canceled. With the large amounts of time and money used in the production of television programs, there exists a need for improved systems and methods to determine a viewer's reduction of interest in a content series.

Accordingly, techniques are disclosed herein for systems and methods to determine a reduction of interest in a content series. The various embodiments disclosed herein provide a computer-implemented method for determining interest in a content series. To begin, the processing circuitry monitors a user's consumption of a content series and associates the consumption with a profile. Using the data gained from monitoring the consumption of the content series, the processing circuitry determines a pattern of consumption associated with the user's consumption. If there is a change in the pattern of consumption that indicates a reduction of interest, the processing circuitry identifies the change in the pattern. The processing circuitry then determines contextual information related to the content series, based at least in part on the change in pattern, and identifies a reason for the reduction of interest. For example, a system can monitor a user who is a regular viewer of the television program Criminal Minds. The system notices that the user watches Criminal Minds every Friday. After season two, the system identifies that the user stopped watching criminal minds, which is an example of a change in the viewing habits of the user for that content series. The system uses the change in pattern and checks it against contextual information relating to Criminal Minds. Contextual information for Criminal Minds may include actors leaving the program, change in the program's time slot, premier of other related programs, or similar such information. In this example, the system determines that the user stopped watching Criminal Minds at the same time Mandy Patinkin left the program. Accordingly, the system identifies that Mandy Patinkin leaving Criminal Minds was the reason the user had reduced interest in the program.

The various embodiments disclosed herein also provide a computer-implemented method for increasing interest in a content series. To begin, the processing circuitry monitors a user's consumption of a content series and associates the consumption with a profile. If there is a reduction in interest of the user, the process circuitry uses the data gained from monitoring the consumption of the content series to detect the reduction of interest. Using a trained machine learning model, the processing circuitry identifies a reason for the reduction of interest. Then the processing circuitry causes an operation to be performed, such as providing a spoiler, where the parameters of the operation are selected based on the reason for the reduction of interest. For example, a system can monitoring a user who is a regular viewer of Criminal Minds. The system notices that the user has stopped watching Criminal Minds. Using a trained machine learning model, the system identifies that the reason the user stopped watching Criminal Minds was because Mandy Patinkin left the program. The system can then cause a commercial to be shown to the user indicating that Mandy Patinkin is returning to the program in the new season of Criminal Minds, thus reengaging the user.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
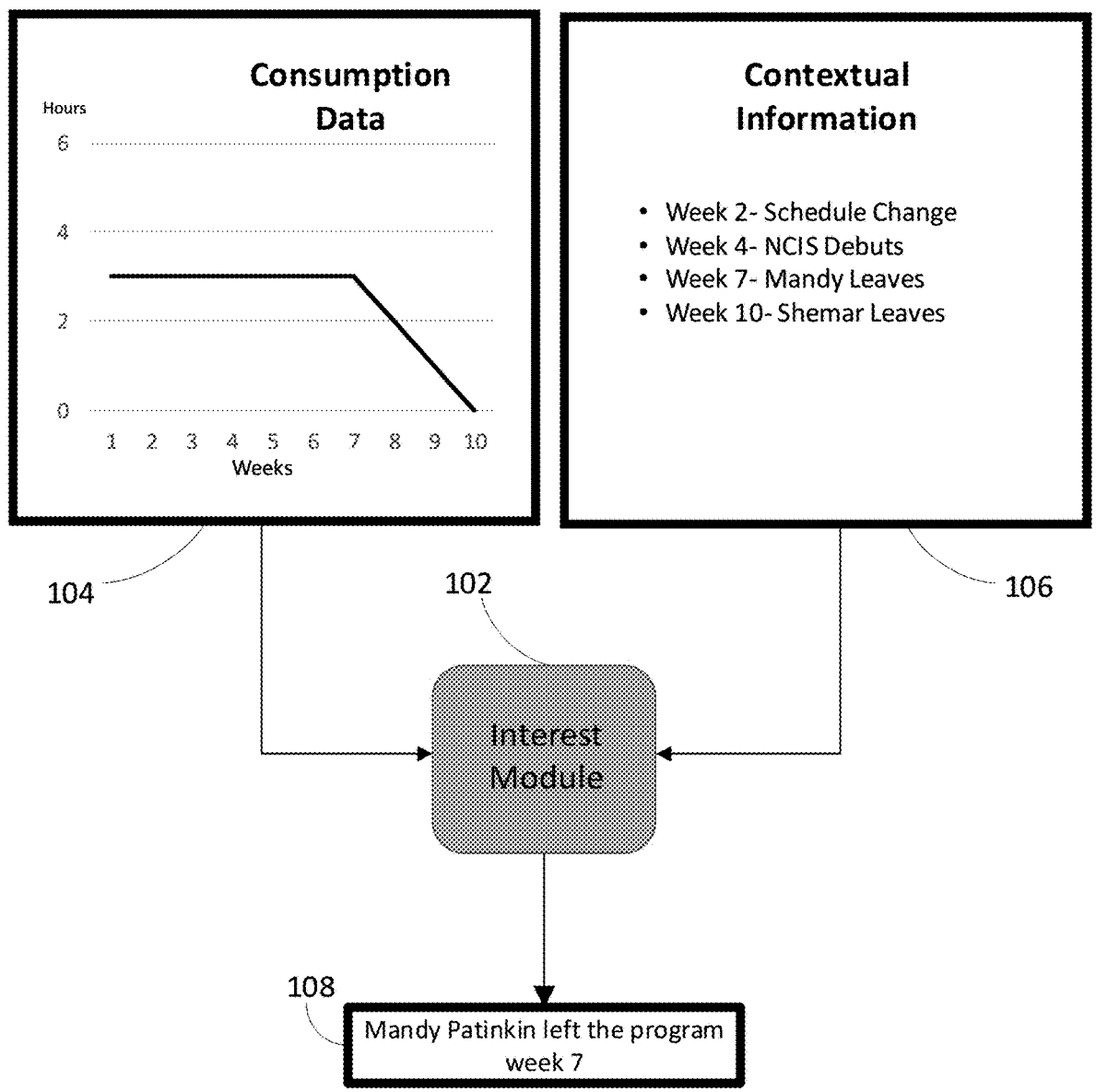
FIG. 1 shows a block diagram of an illustrative process for determining a reduction of interest in a content series, in accordance with some embodiments of the disclosure.

FIG. 1 shows a block diagram 100 of an illustrative process for determining a reduction of interest in a content series, in accordance with some embodiments of the disclosure. In an embodiment, the interest module 102 receives consumption data 104 of a content series, which is collected by monitoring consumption of a content series. In some embodiments, the consumption data 104 may be collected at or by the interest module 102. In some embodiments, the consumption is associated with a profile wherein the profile is associated with a user. A content series may include television programs, movies, audio books, podcasts, playlists, songs, videos, similar such content, and any combination thereof. Consumption of a content series may include frequency of consumption, time period of consumption, similar such consumption matrixes, or any combination thereof.

In FIG. 1, the content series is Criminal Minds, and the consumption data 104 is represented by the number of hours per week the user watches Criminal Minds. The interest module 102 uses the consumption data 104 to determine a pattern of the consumption. In this embodiment, the interest module 102 determines that a pattern of consumption is a user consuming three hours of content a week in the form of watching Criminal Minds episodes. In an embodiment, this determination is made in real time as the interest module 102 receives the consumption data 104, and the determination of the pattern can change as new consumption data is received. The interest module 102 uses the consumption data 104 to identify if a change in the pattern of consumption indicative of a reduction of interest takes place. In this embodiment, the interest module 102 identifies that after week seven, the number of hours per week that the user watches Criminal Minds declines. The interest module 102 identifies that this change in consumption data 104 indicates a reduction in interest of the user.

Based in part on the change in the pattern of the consumption data 104, the interest module 102 determines contextual information related to the content series. In this embodiment, similar to the consumption data 104, the interest module 102 receives contextual information 106 related to the content series. The contextual information 106 may include actors leaving the program, change in the program's time slot, premier of other related programs, similar such information, or a combination thereof. The interest module 102 receives a plurality of contextual information 106 and determines which of the plurality of contextual information relates to the change in the pattern identified from the consumption data 104. The interest module 102 determines that the change in the pattern at week seven coincides with contextual information about Criminal Minds that actor Mandy Patinkin left the program at week seven. Accordingly, the interest module identifies a reason 108 for the reduction of interest. In this embodiment, the interest module 102 identifies Mandy Patinkin leaving Criminal Minds as the reason 108 for the change in the pattern of consumption.

Figure 2:
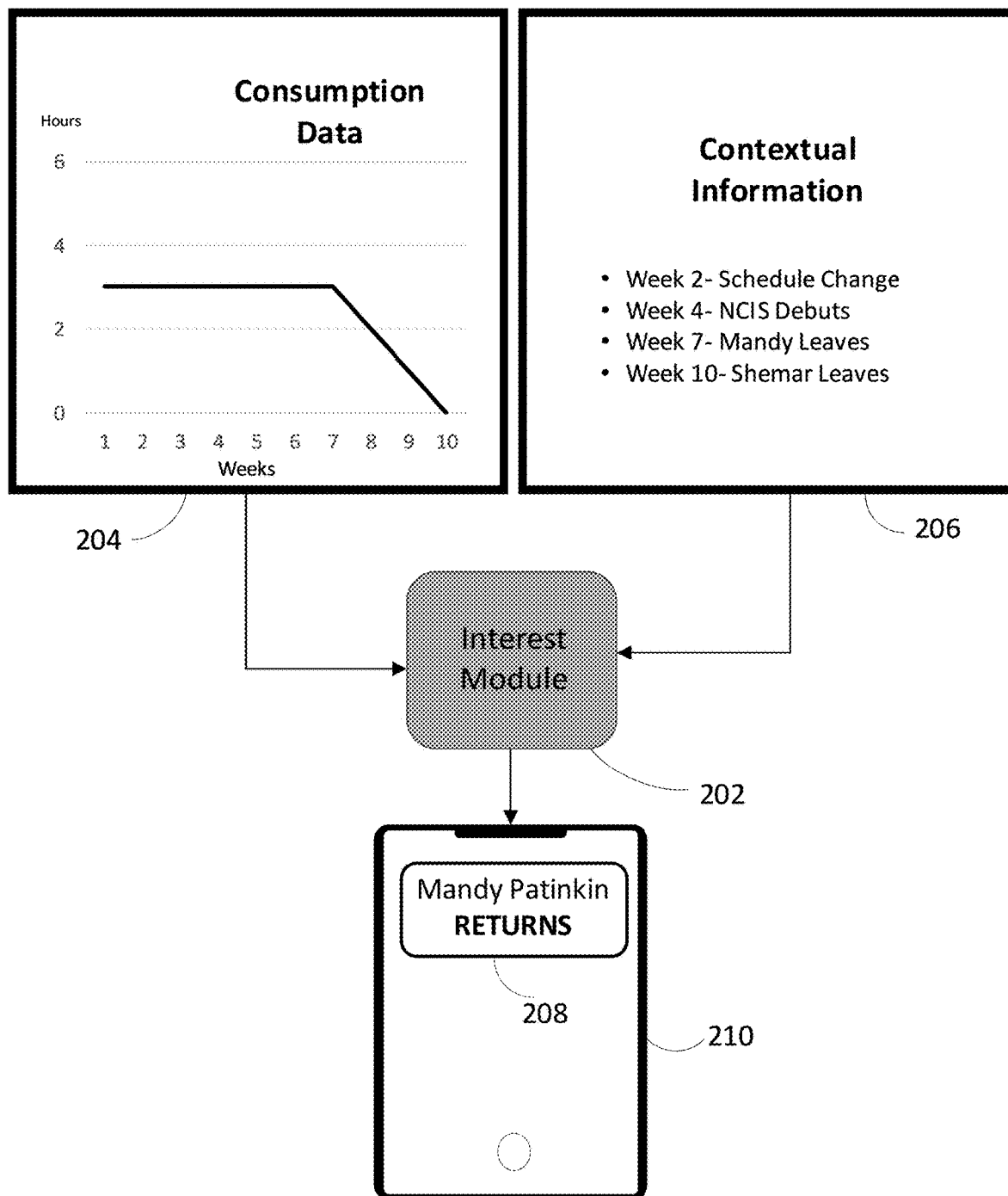
FIG. 2 shows a block diagram of an illustrative process for determining a reduction of interest in a content series and providing a spoiler, in accordance with some embodiments of the disclosure.

FIG. 2 shows a block diagram 200 of an illustrative process for determining reduction of interest in a content series and providing a spoiler, in accordance with some embodiments of the disclosure. In this embodiment, the interest module 202 receives consumption data 204 and contextual information 206 in the same manner described in FIG. 1. In this embodiment, the interest module 202 identifies a reason for the reduction of interest using a trained machine learning module. Similar to FIG. 2, the interest model 202, identifies Mandy Patinkin leaving Criminal Minds as the reason for the reduction of interest. The interest module 202 then performs an operation to reengage the user, wherein the parameters of the operation are related to the reason for the reduction of interest. In this embodiment, the interest module 202 causes a spoiler to be displayed on a user device. Here the spoiler is a push notification 208, but spoilers can include commercials, promotional videos, phone calls, audio advertisements, multimedia messages, similar such content, or a combination thereof. The spoiler can be displayed on a smartphone 210, or any similar device. Because the reason for the reduction of interest was Mandy Patinkin leaving the show, the interest module 202 determined that the spoiler "Mandy Patinkin Returns" would relate to this reason and reengage the user.

Figure 3A:
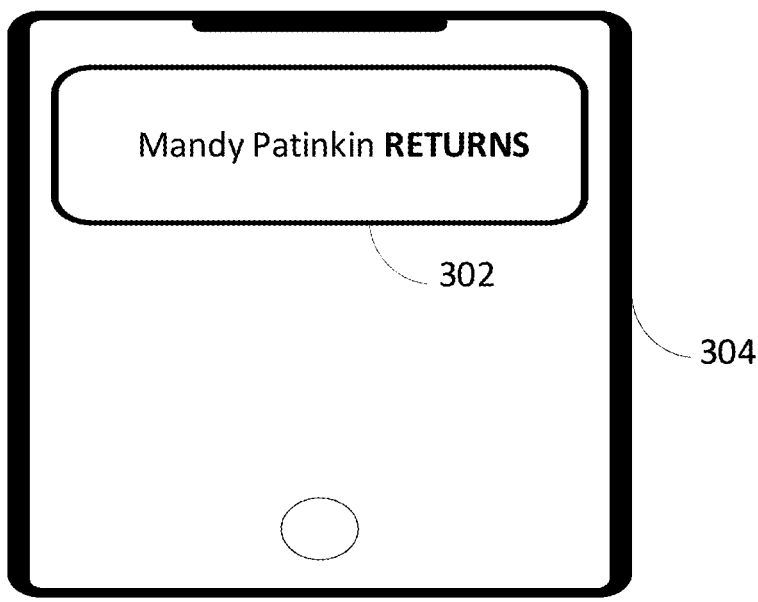
FIGS. 3A and 3B show illustrative diagrams of displaying spoilers on devices, in accordance with some embodiments of the disclosure.
Figure 3B:
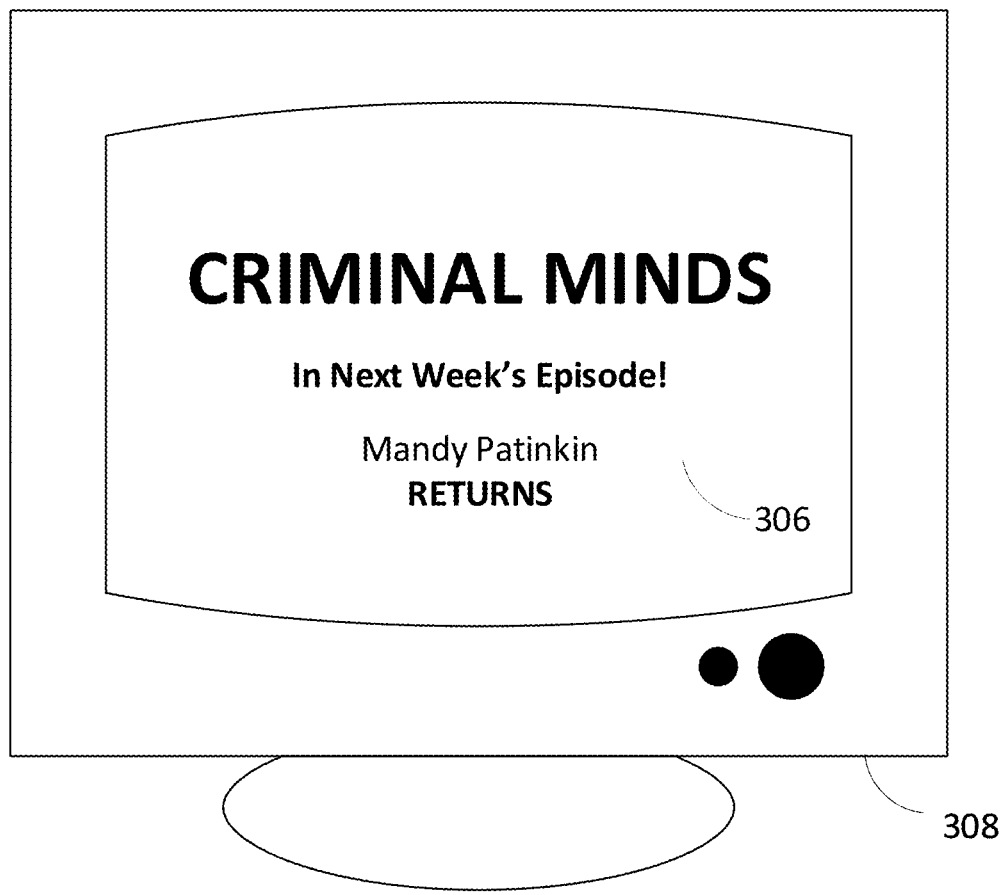

FIGS. 3A and 3B show illustrative diagrams of displaying spoilers on devices, in accordance with some embodiments of the disclosure. FIG. 3A shows a smartphone device 304 displaying a notification 302 with a spoiler. FIG. 3B shows a television 308 displaying a commercial 306 with a spoiler.

Figure 4:
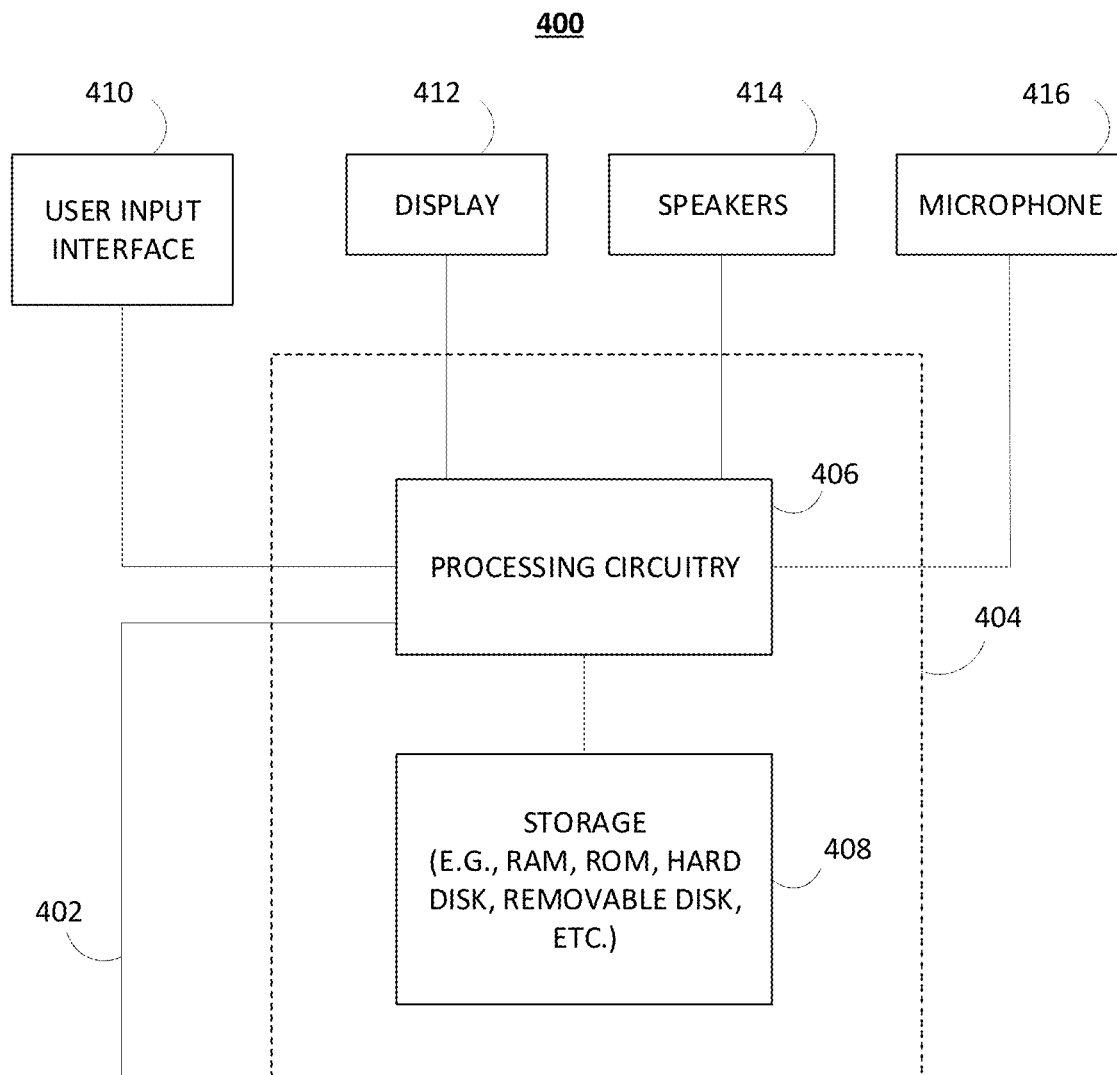
FIG. 4 shows an illustrative block diagram of a user equipment (UE) device system, in accordance with some embodiments of the disclosure.
Figure 5:
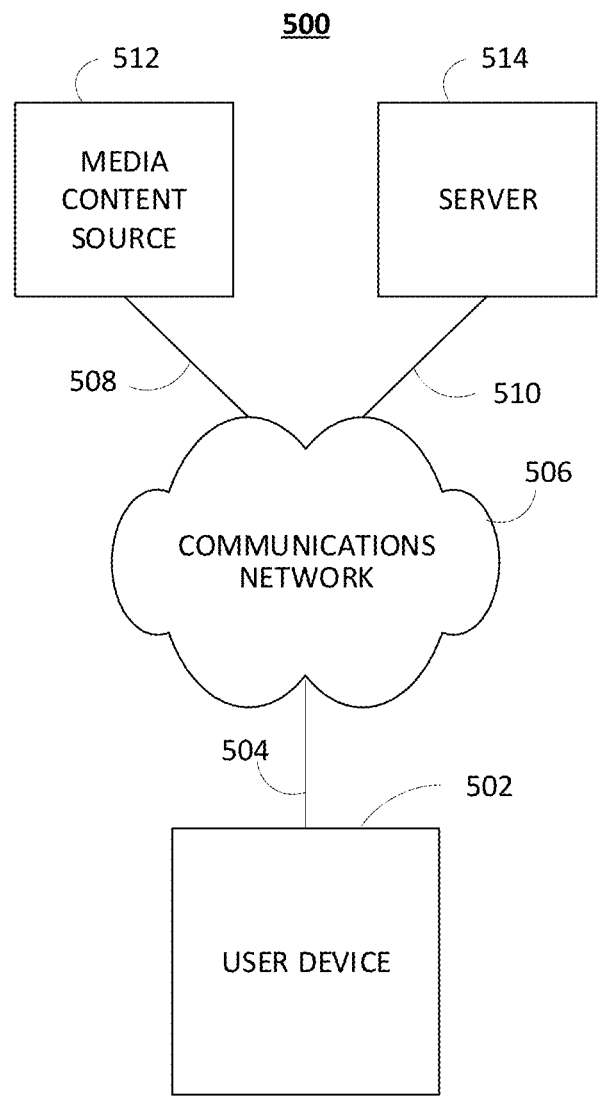
FIG. 5 shows an illustrative block diagram of a media system, in accordance with some embodiments of the disclosure.

FIGS. 4-5 describe exemplary devices, systems, servers, and related hardware for determining a reduction of interest in a content series and to increasing the interest upon such determination, in accordance with some embodiments. FIG. 4 shows a generalized embodiment of a user equipment device 400, in accordance with some embodiments.

The user equipment device 400 may receive content and data via input/output (hereinafter "I/O") path 402. The I/O path 402 may provide audio content (e.g., broadcast programming, on-demand programming, Internet content, content available over a local area network (LAN) or wide area network (WAN), and/or other content) and data to control circuitry 404, which includes processing circuitry 406 and storage 408. The control circuitry 404 may be used to send and receive commands, requests, and other suitable data using the I/O path 402. The I/O path 402 may connect the control circuitry 404 (and specifically the processing circuitry 406) to one or more communications paths (described below). I/O functions may be provided by one or more of these communications paths but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The interest module can be at least partially implemented using the control circuitry 404. The interest module is any suitable software, hardware, or both that implements the features of the present disclosure related to monitoring interest in content as well as associated functionality described herein, including finding reasons for reduced interest, and performing operations in response to a reduction of interest. The interest module can be implemented on user equipment, on remote servers, or across both.

In client/server-based embodiments, the control circuitry 404 may include communications circuitry suitable for communicating with one or more servers that may at least implement an interest module. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. The storage 408 may be used to store various types of content described herein. Nonvolatile memory may also be used (e.g., to launch a boot-up routine and other instructions). Cloud-based storage, described in relation to FIG. 5, may be used to supplement the storage 408 or instead of the storage 408.

The control circuitry 404 may include audio generating circuitry and tuning circuitry, such as one or more analog tuners, audio generation circuitry, filters or any other suitable tuning or audio circuits or combinations of such circuits. The control circuitry 404 may also include scaler circuitry for upconverting and down converting content into the preferred output format of the user equipment device 400. The control circuitry 404 may also include digital-to-analog converter circuitry and analog-to-digital converter circuitry for converting between digital and analog signals. The tuning and encoding circuitry may be used by the user equipment device 400 to receive and to display, play, or record content. The circuitry described herein, including, for example, the tuning, audio generating, encoding, decoding, encrypting, decrypting, scaler, and analog/digital circuitry, may be implemented using software running on one or more general purpose or specialized processors. If the storage 408 is provided as a separate device from the user equipment device 400, the tuning and encoding circuitry (including multiple tuners) may be associated with the storage 408.

The user equipment device 400 may optionally include a user interface 410. The interface 410 may be any suitable user interface, such as a remote control, mouse, trackball, keypad, keyboard, touchscreen, touchpad, stylus input, joystick, or other user input interfaces. A display 412 may be provided as a stand-alone device or integrated with other elements of the user equipment device 400. For example, the display 412 may be a touchscreen or touch-sensitive display. In such circumstances, the interface 410 may be integrated with or combined with the microphone 416. When the interface 410 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 410 may be HDTV-capable. In some embodiments, the display 412 may be a 3D display. The speaker (or speakers) 414 may be provided as integrated with other elements of user equipment device 400 or may be a stand-alone unit.

The user equipment device 400 of FIG. 4 can be implemented in system 500 of FIG. 5 as user device 502, but any other type of user equipment suitable for determining reduction of interest in a content series may be used. For example, user equipment devices such as television equipment, wireless user communication devices, or similar such devices may be used. User equipment devices may be part of a network of devices. Various network configurations of devices may be implemented and are discussed in more detail below.

In the system 500, there can be more than one user equipment device but only one is shown in FIG. 5 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 506.

The user equipment devices may be coupled to communications network 506. Namely, the user device 502 is coupled to the communications network 506 via communications path 504. The communications network 506 may be one or more networks including the Internet, a mobile phone network, mobile voice or data network (e.g., a 4G or LTE network), cable network, public switched telephone network, or other types of communications network or combinations of communications networks. The path 504 may separately or together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 504 can be a wireless path. Communications with the user equipment device may be provided by one or more communications paths but is shown as a single path in FIG. 5 to avoid overcomplicating the drawing.

The system 500 also includes content source 512, and server 514, which can be coupled to any number of databases providing information to the interest module 102 in FIG. 1. The content source 512 represents any computer-accessible source of content, such as a storage for audio content, metadata, or similar such information. The server 514 may store and execute various software modules for implementing the interest module functionality of the interest module 102.

Figure 6:
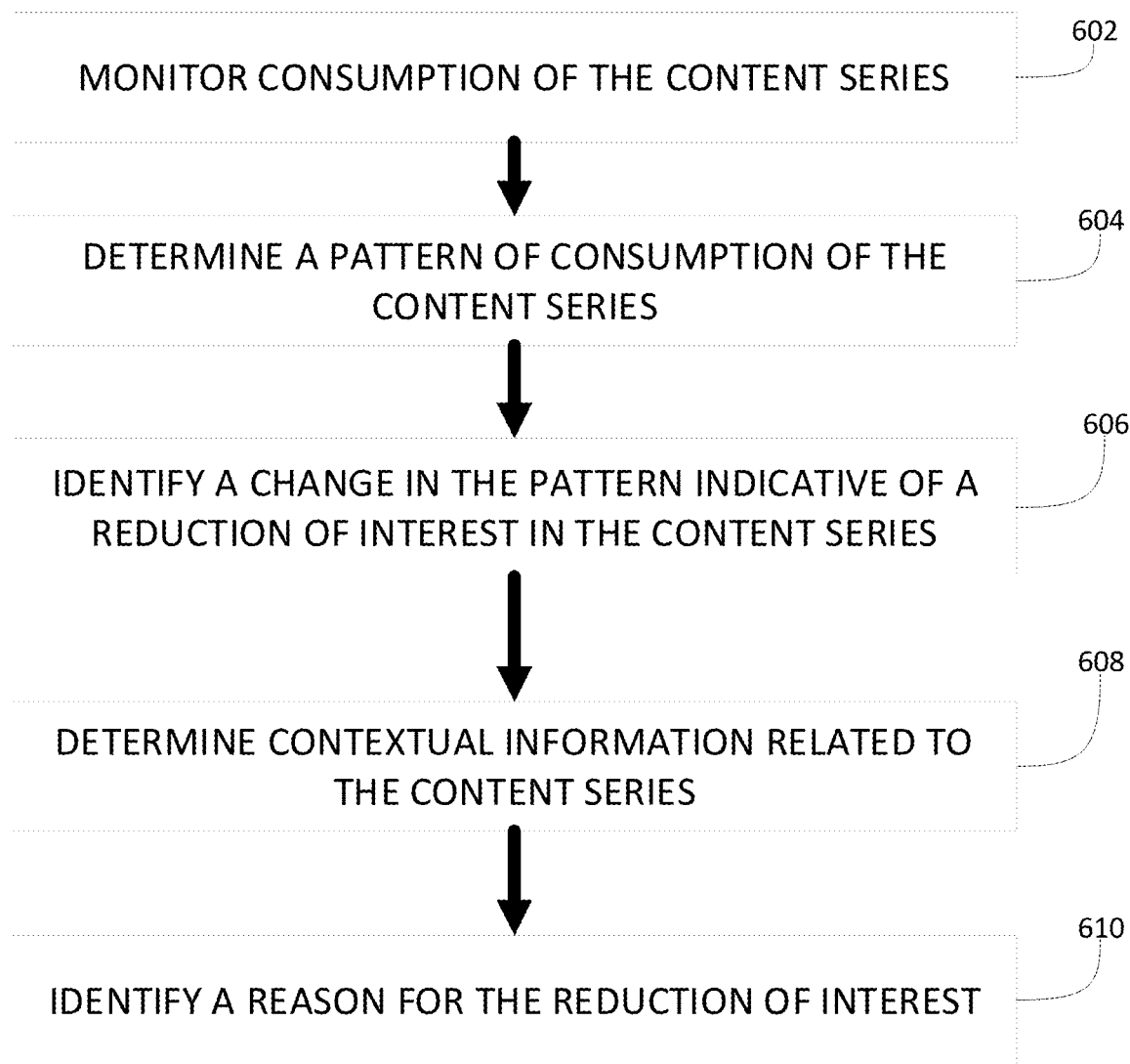
FIG. 6 is an illustrative flowchart of a process for determining a reduction of interest in a content series, in accordance with some embodiments of the disclosure.

FIG. 6 is an illustrative flowchart of a process 600 for determining a reduction of interest in a content series, in accordance with some embodiments of the disclosure. Process 600, and any of the following processes, may be executed by control circuitry 404. Control circuitry 404 may be part of an interest module 102, or of a remote server separated from the interest module 102 by way of a communications network or distributed over a combination of both. In some embodiments, instructions for executing process 600 may be encoded onto a non-transitory storage medium (e.g., the storage 408) as a set of instructions to be decoded and executed by processing circuitry (e.g., the processing circuitry 406). Processing circuitry may, in turn, provide instructions to other sub-circuits contained within control circuitry 404, such as the encoding, decoding, encrypting, decrypting, scaling, analog/digital conversion circuitry, and the like. It should be noted that the process 600, or any step thereof, could be performed on, or provided by, any of the devices shown in FIGS. 1-5. Although the process 600 is illustrated as described as a sequence of steps, it is contemplated that various embodiments of process 600 may be performed in any order or combination and need not include all the illustrated steps.

At 602, the interest module, by control circuitry 404, monitors consumption of a content series, the consumption associated with a profile. In some embodiments, the profile represents one or more users. For example, a profile associated with a single user may have a piece of identifying information such as name, identification number, address, demographic, interests, similar such information, or a combination thereof. In some embodiments, a profile may represent a group of users. For example, a profile could represent all people in a certain region, all people who like horror movies, or all people with both characteristics. In some embodiments, a user equipment device 400 generates or assigns a profile to one or more users. In an embodiment, a user may create or select a profile for themselves. In some embodiments, the profile is associated with a social networking account of one or more users. In an embodiment, the profile is stored in storage 408 of a user equipment device 400. In some embodiments, monitoring is performed by tracking different types of consumption of a content series including observing the content series, reading articles and/or blog posts related to the content series, posting on a social networking account about the content series, attending special events related to the content series, similar such activities, or a combination thereof. In some embodiments, the interest module receives consumption data from other user devices, media content sources 512, and/or servers 514, via the I/O path 402.

At 604, the interest module, by control circuitry 404, determines a pattern of consumption of the content series. In some embodiments, the interest module uses the consumption data gained from step 602 to determine a pattern of consumption. In some embodiments, the interest module uses pattern recognition techniques to determine a pattern of consumption from the consumption data. In some embodiments, the interest module uses a trained machine learning model to determine a pattern of consumption from the consumption data. In some embodiments, this consumption data may be pre-processed and classified e.g., using any appropriate data mining classification algorithm (e.g., Naïve Bayes, Stochastic Gradient Descent, K-Nearest Neighbors, Decision Tree, Random Forest, Neural Networks, Support Vector Machine, etc.). For example, a known data mining classification algorithm can be used to classify information for the interest module 102. After the information is classified, it may be stored in, e.g., a classified information database. Periodically, when additional consumption data is received, the classified information database may be updated by classifying the additional consumption data. The types of identified patterns can vary to reflect different types of viewing habits. For example, if the type of consumption monitored is the amount of hours per week that a user watches a television program, the types of patterns can vary. Some users watch a television program as fast as possible ("binge watchers"), other users watch a few episodes of the television program per week, while other users watch the television program's episodes as they air. In some embodiments, the determination of the pattern of consumption is performed on user devices 502, media content sources 512, and/or servers 514, and is sent to the interest module.

At 606, the interest module, by control circuitry 404, identifies a change in the pattern indicative of a reduction of interest in the content series. In some embodiments, the interest module uses pattern recognition techniques as discussed above to identify a change in the pattern of consumption. In one embodiment, a trained machine learning model determines if there is a change in the pattern of consumption. In an embodiment, when the interest module determines a change in the pattern of consumption, the interest module must then determine if the change in the pattern is indicative of a reduction of interest. For example, a change in the pattern of consumption may be a decrease in the number of hours of consumption per week to below a threshold, wherein the threshold is determined by the interest module. In an embodiment, a change in a pattern of consumption may be that the frequency of consumption decreases over a time period. In some embodiments, the interest module recognizes only changes in the pattern of consumption indictive of a reduction of interest, for example if a user went from consuming two hours of content a week to five hours a week, the interest module would not recognize this as a change in the pattern of consumption and instead would just update the determined pattern of consumption accordingly.

At 608, the interest module, by control circuitry 404, determines contextual information related to the content series. In some embodiments, contextual information is stored in storage in the interest module. In some embodiments, contextual information is sent to the interest module though user devices 502, media content sources 512, and/or servers 514. In some embodiments, contextual information may include actors leaving the program, changes in the program's time slot, premier of other related programs, new actors joining the program, changes in storyline, changes in pace of the program, changes in critic reviews, repeating of plotlines, or similar such information. In some embodiments, the interest module identifies a change in the pattern of consumption in step 606 and requests content information related, at least in part, to the change in pattern. The interest module may request this contextual information from user devices 502, media content sources 512, and/or servers 514. In some embodiments, the interest module determines contextual information related to the change in consumption pattern from contextual information stored in storage on the interest module.

At 610, the interest module, by control circuitry 404, identifies a reason for reduction of interest. In some embodiments, the interest module uses the identified change in pattern and contextual information based at least in part on the change in pattern and identifies a reason for the reduction of interest. For example, if the change in the pattern begins at week seven, the interest module can use contextual information to determine that during week seven of the content series a main actor left the program. Accordingly, the interest module identifies the reason for the reduction of interest is the main actor leaving the program.

Figure 7:
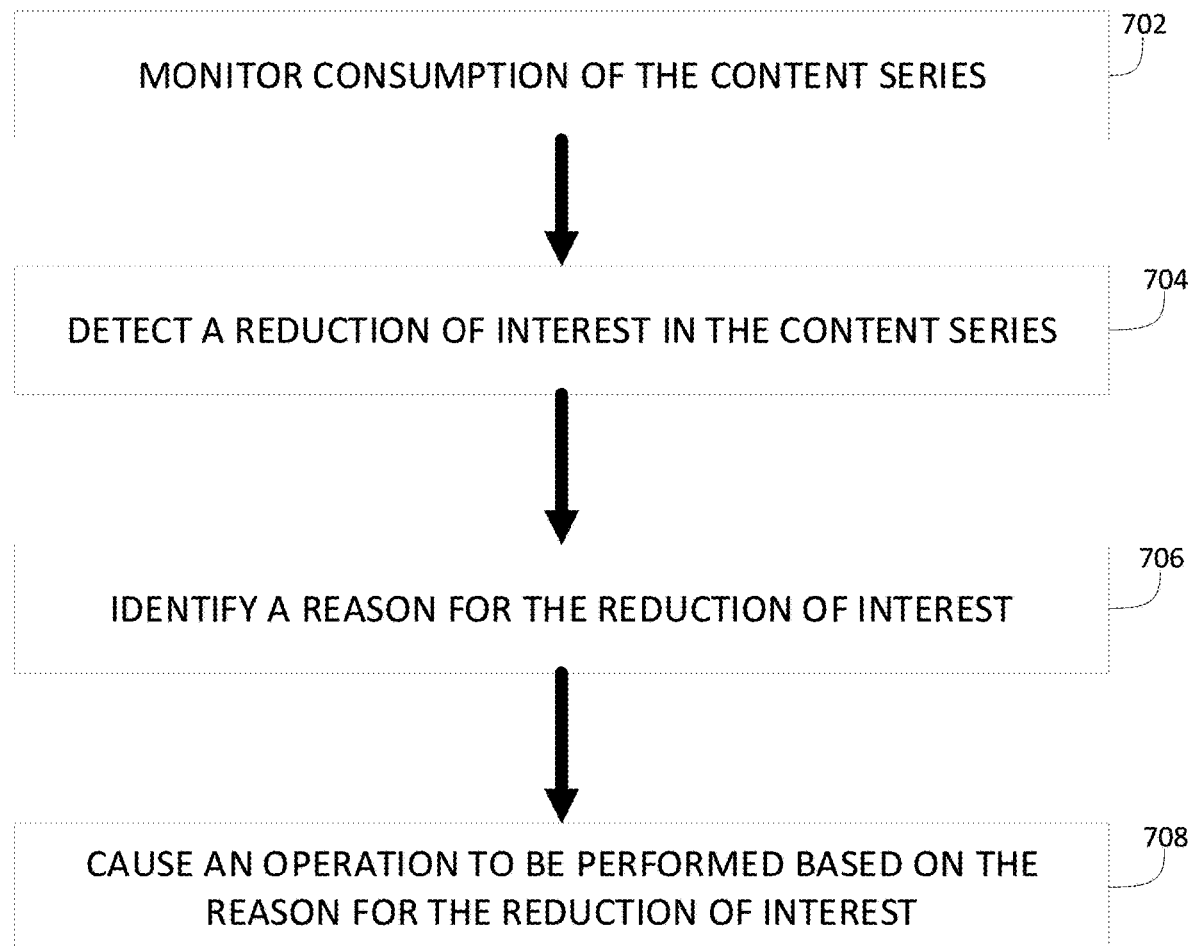
FIG. 7 is an illustrative flowchart of a process for determining a reduction of interest in a content series and causing an operation to be performed, in accordance with some embodiments of the disclosure.

FIG. 7 is an illustrative flowchart of a process 700 for determining a reduction of interest in a content series and providing an operation to be performed, in accordance with some embodiments of the disclosure. At step 702, the interest module, by control circuitry 404, monitors consumption of a content series. The monitoring of consumption of the content series can use the methods and techniques described in step 602 above.

At 704, the interest module, by control circuitry 404, detects a reduction of interest in the content series. In some embodiments, the interest module uses similar methods similar to those discussed above discussing determining a pattern of consumption and detecting a reduction of interest relating to the determined pattern. In one embodiment, a trained machine learning model determines a pattern of consumption and then determines if there is a change in the pattern of consumption. If the change in the pattern of consumption indicates a reduction of interest, the interest module detects the reduction of interest. For example, if a user went from consuming three hours of content a week to one hour a week, the interest module would detect this as a reduction of interest in the content series.

At 706, the interest module, by control circuitry 404, identifies a reason for reduction of interest. In some embodiments, the interest module uses an identified change in pattern and contextual information based at least in part on the change in pattern and identifies a reason for the reduction of interest. For example, if the change in the pattern begins at week seven, the interest module can use contextual information to determine that during week seven of the content series a main actor left the program. Accordingly, the interest module identifies the reason for the reduction of interest is the main actor leaving the program. In an embodiment, the interest module can determine that there may be more than one reasons for the reduction of interest. In such an embodiment, the interest module may rank each reason for the reduction of interest with a confidence score, wherein each confidence score indicates the likelihood that the ranked reason is the most influential in the reduction of interest. In an embodiment, the reason or reasons for reduction of interest are sent to a server, where the reasons can be aggregated to produce reduction of interest data.

At 708, the interest module, by control circuitry 404, causes an operation to be performed based on the reason for the reduction of interest. In some embodiments, the operation includes providing a spoiler, generating an advertisement, offering promotional giveaways, similar such operations, or a combination thereof. For example, if the reason for the reduction of interest was an actor leaving the show and in a future episode the actor returns, the interest module can cause a spoiler to be provided to be displayed on a user device 502 indicating that the actor will return to the show.

Figure 8:
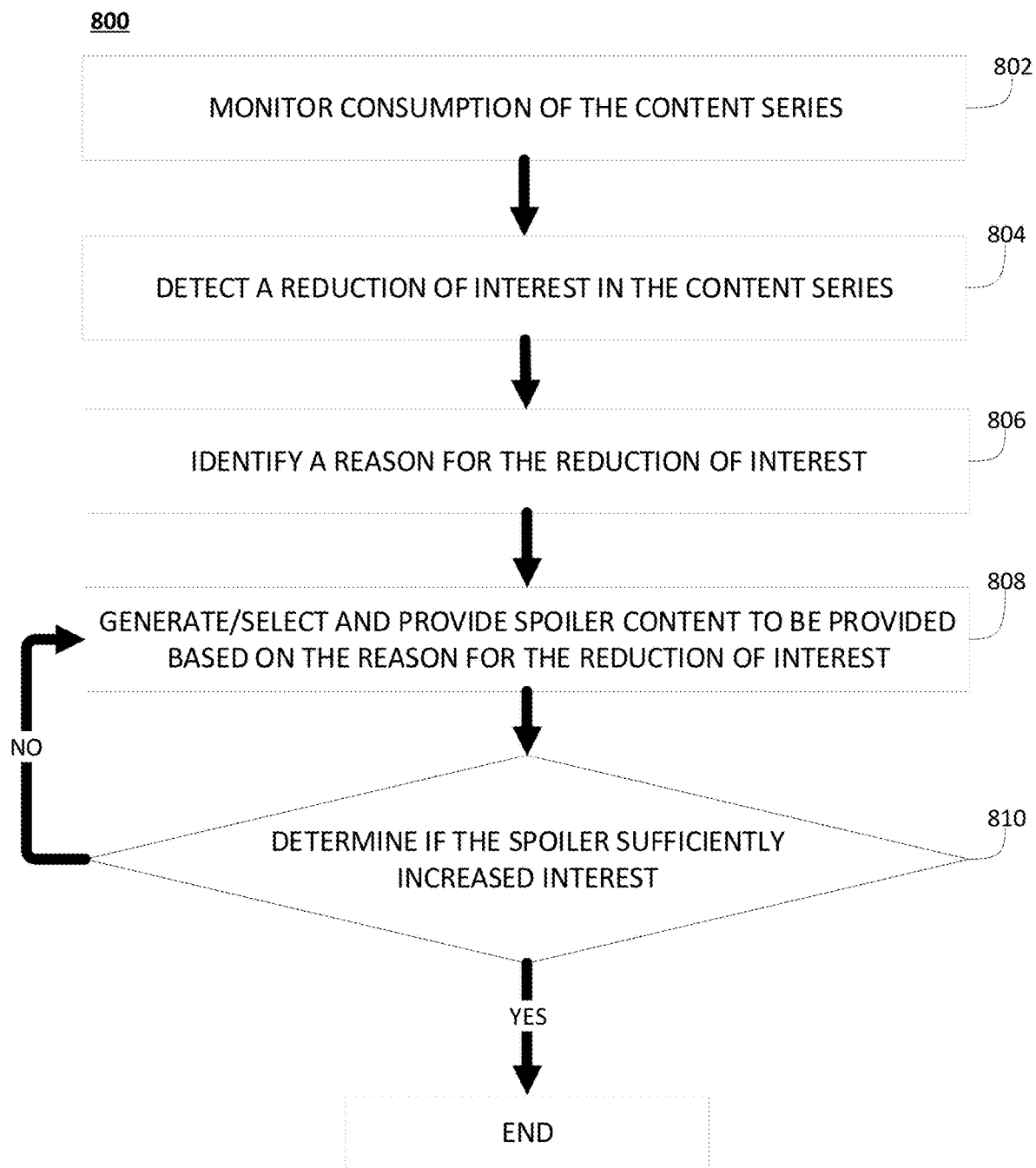
FIG. 8 is an illustrative flowchart of a process for determining a reduction of interest in a content series and providing a spoiler based on the reduction of interest, in accordance with some embodiments of the disclosure.

FIG. 8 is an illustrative flowchart of a process 800 for determining a reduction of interest in a content series and providing a spoiler based on the reduction of interest, in accordance with some embodiments of the disclosure. At step 802, the interest module, by control circuitry 404, monitors consumption of a content series. The monitoring of consumption of the content series can use the methods and techniques described in step 602 above.

At step 804, the interest module, by control circuitry 404, detects a reduction of interest in a content series. The detection of a reduction of interest in the content series can use the methods and techniques described in step 704 above.

At step 806, the interest module, by control circuitry 404, identifies a reason for the reduction of interest. The identification of the reason for the reduction of interest can use the methods and techniques described in step 706 above. In some embodiments, the interest module will use a user's interactions with social networking sites to aid in identifying a reason for the reduction of interest.

At step 808, the interest module, by control circuitry 404, generates or selects and provides spoiler content to be provided based on the reason for the reduction of interest. In some embodiments, the interest module has relational databases or metadata, stored in storage 408, that allows the interest module to associate pre-generated spoilers with certain identifiers, wherein the identifiers can relate to actors, storylines, and similar such information. In an embodiment, the interest module cross-references the reason for reduction of interest with the identifiers in the database to select a spoiler. In some embodiments, the interest module sends the reason for the reduction of interest to user devices 502, media content sources 512, and/or servers 514, which generate and send one or more spoilers to the interest module. Spoilers are events in a content item that reveal important plot elements that a user does not know and was not intended to know before watching the content. Some examples of spoilers include details of the conclusion of a plot or storyline that the user has not yet watched, plot twists, character deaths, climatic events, and similar such events. In some embodiments, the spoilers can be designated with scores relating to the amount of subject matter included in the spoiler. For example, a spoiler indicating that a character will be featured in a new episode would have a lower score than a spoiler indicating that the character will be featured in a new episode where he dies.

In an embodiment, the interest module assigns a score based on the interest module's determination of a spoiler's impact on a user. In an embodiment, the interest module can make the determination of a spoiler's impact by cross-referencing the profile of the user and the reduction of interest to an identifier of the spoiler using techniques described above. In an embodiment, the interest module uses data received from content series producers, critics, trained machine learning models, or similar such resources to influence the determination of the spoiler's impact score. In some embodiments, the impact scores may be unique to individuals or the impact score may apply generally. For example, a spoiler related to a major plot twist will have a generally high impact score regardless of the user, but a spoiler's impact score related to a particular actor may vary depending on the user. In some embodiments, the interest module will determine a low impact score for a spoiler including an actor when a user does not care about that actor. In an embodiment, where a user likes a particular actor, the interest module will determine a high impact score for spoilers including that actor. In some embodiments, the interest module generates a spoiler based on the reason for the reduction of interest. In an embodiment, if the interest module determines that the reason for the reduction of interest is that the actor Mandy Patinkin left the content series, Criminal Minds, the interest module will generate a spoiler in the form of a commercial indicating that Mandy Patinkin will return to the show. The interest module causes the user device 400 to display the commercial with the spoiler on the display 412 of user device 400.

At step 810, the interest module, by control circuitry 404, determines if the spoiler sufficiently increased the user's interest. In some embodiments, the interest module uses methods similar to those discussed above to determine if the spoiler sufficiently increased interest. In one embodiment, a trained machine learning model determines a pattern of consumption and then determines if there is a change in the pattern of consumption corresponding to providing the spoiler. If the change in the pattern of consumption indicates an increased interest, the interest module does not generate any additional spoilers and the process 800 ends. In an embodiment, if there is no change in the pattern of consumption corresponding to providing the spoiler, or if there is an increased interest but the increased interest is below a threshold, the interest module returns to step 808 and generates or selects an additional spoiler. In one embodiment, the interest module generates a second spoiler comprising additional subject matter. In an embodiment, the interest module generates a second spoiler with a spoiler score greater than the spoiler score of the first displayed spoiler. For example, the first spoiler may indicate that a character will be featured in a new episode; after no increased interest, the second generated spoiler will indicate that the character will be featured in a new episode where he dies. In an embodiment, the interest module provides the second spoiler with a different method than that of the first spoiler. For example, if the first spoiler was a notification on a mobile device as in FIG. 3A, the second spoiler may be a commercial shown on a different device as shown in FIG. 3B.

It is contemplated that some suitable steps or suitable descriptions of FIGS. 6-8 may be used with other suitable embodiments of this disclosure. In addition, some suitable steps and descriptions described in relation to FIGS. 6-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 6-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   detecting, at a first device, an amount of consumption of a content series for a first time period;
   determining a first estimated amount of consumption of the content series for a second time period based on the amount of consumption of the content series for the first time period;
   detecting, at the first device, that a first actual amount of consumption of the content series for the second time period is less than the first estimated amount of consumption for the second time period;
   in response to detecting that the first actual amount of consumption is less than the first estimated amount of consumption, displaying a first piece of content related to the content series;
   determining a second estimated amount of consumption of the content series for a third time period based on the first actual amount of consumption of the content series for the second time period, wherein the third time period is after the display of the first piece of content;
   detecting, at the first device, that a second actual amount of consumption of the content series for the third time period is less than or the same as the second estimated amount of consumption for the third time period; and
   in response to detecting that the second actual amount of consumption is less than or the same as the second estimated amount of consumption, displaying a second piece of content related to content series.

2. The method of claim 1, wherein the first piece of content relates to an event in the content series during the second time period.

3. The method of claim 2, wherein the second piece of content comprises additional information relating the event in the content series during the second time period.

4. The method of claim 1, wherein the second piece of content relates to an event in the content series during the second time period.

5. The method of claim 1, wherein the first piece of content comprises at least one of a change in plot of the content series, a change in actors of the content series, a change in production of the content series, or a change in schedule of the content series.

6. The method of claim 5, wherein the second piece of content comprises at least one of a change in plot of the content series, a change in actors of the content series, a change in production of the content series, or a change in schedule of the content series.

7. The method of claim 1, wherein the first piece of content and the second piece of content are displayed on the first device.

8. The method of claim 1, wherein the first piece of content is displayed on the first device, and the second piece of content is displayed on a second device.

9. The method of claim 1, wherein the second piece of content is longer than the first piece of content.

10. An apparatus comprising:
    control circuitry; and
    at least one memory including computer program code for one or more programs, the at least one memory and the computer program code configured to, with the control circuitry, cause the apparatus to perform at least the following:
    receive an amount of consumption of a content series for a first time period;
    determine a first estimated amount of consumption of the content series for a second time period based on the amount of consumption of the content series for the first time period;
    determine that a first actual amount of consumption of the content series for the second time period is less than the first estimated amount of consumption for the second time period;
    in response to determining that the first actual amount of consumption is less than the first estimated amount of consumption, generate a first piece of content related to the content series;
    determine a second estimated amount of consumption of the content series for a third time period based on the first actual amount of consumption of the content series for the second time period, wherein the third time period is after the generation of the first piece of content;
    determine that a second actual amount of consumption of the content series for the third time period is less than or the same as the second estimated amount of consumption for the third time period; and
    in response to determining that the second actual amount of consumption is less than or the same as the second estimated amount of consumption, generating a second piece of content related to content series.

11. The apparatus of claim 10, wherein the first piece of content relates to an event in the content series during the second time period.

12. The apparatus of claim 11, wherein the second piece of content comprises additional information relating the event in the content series during the second time period.

13. The apparatus of claim 10, wherein the second piece of content relates to an event in the content series during the second time period.

14. The apparatus of claim 10, wherein the first piece of content comprises at least one of a change in plot of the content series, a change in actors of the content series, a change in production of the content series, or a change in schedule of the content series.

15. The apparatus of claim 14, wherein the second piece of content comprises at least one of a change in plot of the content series, a change in actors of the content series, a change in production of the content series, or a change in schedule of the content series.

16. The apparatus of claim 10, wherein the control circuitry is further configured to transmit the first piece of content and the second piece of content to a first device.

17. The apparatus of claim 10, wherein the control circuitry is further configured to transmit the first piece of content to a first device and the second piece of content to a second device.

18. The apparatus of claim 10, wherein the second piece of content is longer than the first piece of content.

* * * * *